United States Patent [19]

Mol

[11] Patent Number: 4,501,450
[45] Date of Patent: Feb. 26, 1985

[54] CONNECTING DEVICE BETWEEN TWO WHEEL RIMS

[76] Inventor: Pieter K. Mol, Noordzakweg 21, 4458 RA 's-Heer Arendskerke, Netherlands

[21] Appl. No.: 450,599

[22] Filed: Dec. 17, 1982

[30] Foreign Application Priority Data

Jan. 19, 1982 [NL] Netherlands ................. 8200185

[51] Int. Cl.³ .............................................. B60B 11/02
[52] U.S. Cl. ............................. 301/13 SM; 301/36 R; 301/40 S
[58] Field of Search ............. 301/13 R, 13 SM, 36 R, 301/36 A, 36 WP, 40 S; 152/376

[56] References Cited

U.S. PATENT DOCUMENTS 4,427,237 1/1984 Beegle ............................. 301/13 SM

FOREIGN PATENT DOCUMENTS

| 1083641 | 8/1980 | Canada | 301/36 R |
| 556391 | 10/1943 | United Kingdom | 301/36 R |
| 1498639 | 1/1978 | United Kingdom | 301/36 R |
| 2096072 | 10/1982 | United Kingdom | 301/36 R |

Primary Examiner—David A. Scherbel
Attorney, Agent, or Firm—C. O. Marshall, Jr.

[57] ABSTRACT

The invention relates to a connecting device between two wheel rims comprising an annular intermediate piece in the embodiment of a split ring being radially expandable by mechanism of tensioning means at the position of the dividing slit, the end edges of the intermediate piece being outwardly offset whereby they are permitted to engage behind cams provided at the inner circumferential side of the facing edge portions of both rims and may be clamped by radially expanding the intermediate piece against the relative rim edge portions.

9 Claims, 5 Drawing Figures

CONNECTING DEVICE BETWEEN TWO WHEEL RIMS

The invention relates to a connecting device between two wheel rims, the facing edge portions of both rims being provided at the inner circumferential surface with a plurality of cams which constitute points of engagement for the end edges of an annular intermediate piece, placed coaxially between the rims, tensioning means being provided for clamping the intermediate piece with its end edges to the rims.

Such connecting devices are among other applied to agricultural tractors in circumstances in which it is desirable, in view of the soft soil, to reduce the pressure per surface unit of the drive wheels. Thereto an auxiliary rim is connected coaxially to each of the drive wheels.

With a known connecting device of the type described above the annular intermediate piece is cylindrical and the end edges of this cylindrical intermediate piece are clamped in axial direction against the cams on the relative wheel rims. Adjacent each end edge a plurality of tensioning hooks corresponding to the plurality of cams are applied as the tensioning means. The shafts of said tensioning hooks are mounted slidable in axial direction to the inner circumference of the intermediate ring and may each be tensioned by means of a clamping screw.

For establishing the connection between the connecting device and a wheel rim they are brought together in axial direction in a mutual position in which the tensioning hooks are situated tangentially offset relative to the cams on the rim. As soon as the relative end edges of the cylindrical intermediate piece rests laterally against the relative rim edge or the cams respectively, the connecting device is rotated relative to the rim in order to align the tensioning hooks axially with the cams. Therewith the tensioning hooks extend beyond the cams and the hook ends, which are directed radially outwardly, enter into engagement with the back sides of the cams. Thereafter the cylindrical intermediate piece is clamped in axial direction against the cams by tensioning the tensioning hooks by means of the clamping screws.

Due to the relatively large number of clamping screws that have to be tensioned this known connecting device is onerous and time consuming when used. Furthermore rotating the clamping screws in the relatively narrow space within the cylindrical intermediate piece may be cumbersome.

The invention aims at removing or in any case reducing said disadvantages.

This purpose is achieved according to the invention in that the annular intermediate piece is in the embodiment of a split ring which is radially expandable by means of tensioning means provided at the position of the slit, the end edges of said ring being outwardly offset, the arrangement being such that said end edges are adapted to engage behind the cams and may be radially clamped against the relative rim edge portions by expansion of the intermediate piece.

The provision of the connecting device according to the invention takes place in a situation in which the annular intermediate piece has been contracted to its smallest diameter. The edges of the intermediate piece which are outwardly offset like flanges, are then permitted to pass the cams in axial direction whereafter they may engage behind said cams and are clamped through acutation of the tensioning means whereby the annular intermediate piece is expanded.

In comparison with the known connecting device the necessary number of tensioning means is considerably reduced with the connecting device according to the invention in which said tensioning means are provided at only one position along the circumference of the annular intermediate piece.

The connecting device according to the invention is thereby less onerous in use.

The device according to the invention is also suitable for an embodiment in which the tensioning means are provided at the outer circumference of the intermediate ring. Thereby the tensioning means may be actuated from the space between the pneumatic tires provided on the rims.

A practical and cheap embodiment is obtained if, according to a further feature of the invention, the split ring is constituted by a third rim which is provided with an axial slit at its circumference and the rim edge diameter of which is in the untensioned condition of the rim just somewhat smaller than the (smallest) inscribed circle of the cams. Generally thereto a rim may be selected which is one size smaller than that of the rims to be connected. Thereby the rim edges may, if necessary, be provided with the desired dimension by cutting them on a lathe or by forcing them into a beaded edge. Particularly in this last mentioned embodiment a good clamping action is obtained, as has been shown by experiments, between the split ring (rim) and the rims to be connected.

In a preferably used embodiment the cams are constituted by radially inwardly pressed indentures provided from the outer circumference of the rim bed.

Such indentures may be provided in a simple manner with a tool suitable therefor to rims mounted on an agricultural tractor or similar vehicle. Thereto it is only necessary to vent the air from the relative pneumatic tire in order to permit pushing the tire side wall somewhat inwardly in order to mount the press tool.

The invention is hereunder illustrated with reference to the drawings of a number of embodiments, given as examples.

Figure 1:
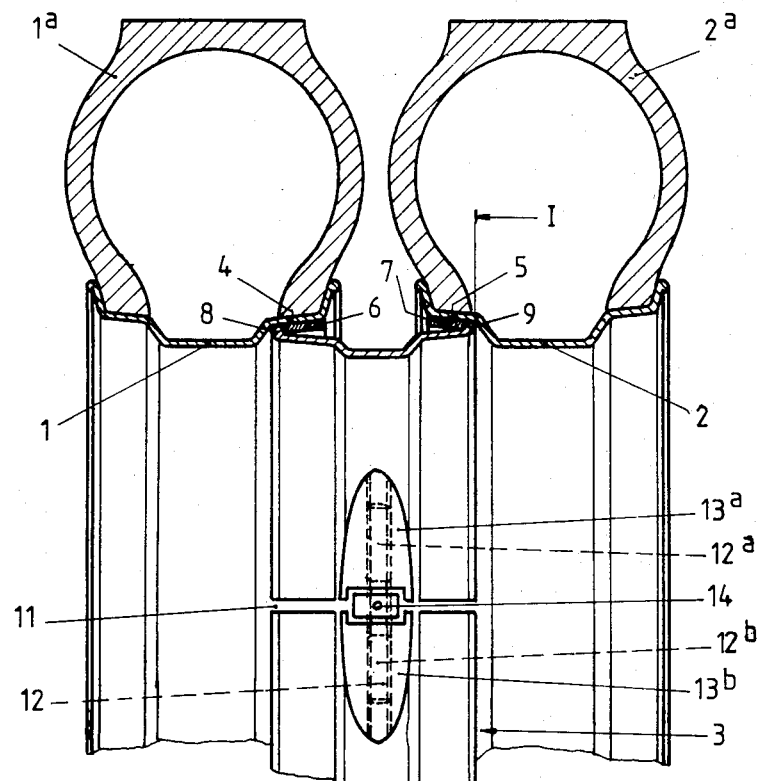
FIG. 1 shows an axial section through two wheel rims which are mutually coupled by means of the connecting device according to the invention.

In the example of FIG. 1 reference numbers 1 and 2 indicate two identical wheel rims, each provided with a pneumatic tire 1a and 2a respectively, said rims having been coupled by means of the connecting device indicated by the reference number 3.

The wheel rim 1 e.g. constitutes the rim of one of the rear drive wheels of the agricultural tractor, in which case the wheel rim 2 may be considered as an auxiliary rim, by means of which the tread surface width of the relative rear drive wheel must be enlarged.

With both wheel rims a plurality of (e.g. five) cams 6 and 7 respectively have been secured to the inner circumference of the rim portions indicated by the reference numbers 4 and 5 respectively, which portions support the bead part of the relative tire 1a or 2a respectively. The wheel rim portions 4 and 5 have a somewhat conical shape as is the case with the generally used rim contours. The cams 6 and 7, which in this case are constituted by metal strips with a thickness of a couple of mms, thereby are situated on two cones which are directed towards each other with their largest base, which is advantageous for the assembly of the connecting device as will appear hereunder.

The cams 6 and 7 cooperate with the flange shaped outwardly directed edges 8 and 9 respectively of the connecting device 3. Said connecting device is constituted in the example under consideration by a third rim 10 of a smaller size than that of the wheel rims 1 and 2 to be connected. The rim edges of said third rim have been deformed into beaded edges and have thereby been given the correct dimension. Furthermore the rim 10 is at one position provided with an axial parting slit 11. It will be clear that by enlarging said slit 11 in tangential direction the rim 10 is expanded in radial direction so that its diameter is increased. The dimensions of the rim 10 have been selected such that the diameter of the beaded edges 8 and 9 in the non-expanded condition of the rim 10 (which also includes the condition in which the axial slit 11 has been reduced to a tangential value of 0) is just smaller than the smallest inscribed circle diameters of the cams 6 and 7. The smallest inscribed circle diameters correspond with the diameters of the smallest base surfaces of the imaginary cone surfaces on which the cams 6 and 7 are provided. When the connecting device 3 is assembled in this untensioned or non-expanded condition respectively in axial direction together with those wheel rims 1 and 2, the beaded edges 8 and 9 may then pass the relative cams 6 and 7 respectively until they are stopped by a further backwardly situated portion of the relative wheel rims. The axial assembly of the three rims is facilitated by the "seeking" effect of the conical shape of the surfaces on which the cams 6 and 7 are situated, as mentioned above.

After in this way the three rims have been assembled in axial direction a coupling between both wheel rims 1 and 2 against mutual rotation is established by expanding the rim 10 in radial direction such that the beaded edges 8 and 9 are clamped behind the edges of the cams 6 and 7 facing in opposite directions, against the inner circumference of the wheel rims. The radial expansion of the rim is brought about by means of a screw spindle 12 provided at the position of the dividing slit 11, the axis of said spindle being a tangent to the rim circumference at that position. The screw spindle 12 comprises two portions 12a and 12b respectively having opposite hand, said portions being received in thickened portions 13a and 13b respectively of rim portions adjacent to both sides of the axial dividing slit 11 and provided with corresponding screw threads.

Figure 2:
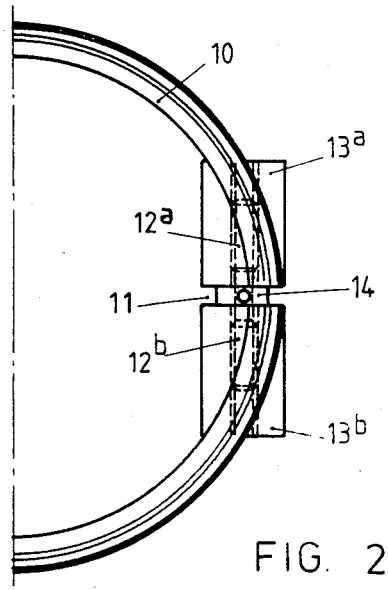
FIG. 2 shows an elevation of the split connecting ring at the position of the slit, as seen according to the arrow I in FIG. 1.

In the embodiment according to FIGS. 1 and 2 a collar 14 has been provided intermediate the sections 12a and 12b of the screw spindle 12, the periphery of said collar being adapted for the engagement with a tool suitable for the rotation of the screw spindle. The collar thereto is provided with a plurality of radial insert apertures for a rod shaped lever. It will be clear that in the embodiment according to FIGS. 1 and 2 the screw spindle 12 may be rotated by inserting a rod from the space surrounded by the rim 10 into one of the insert apertures of the collar 14.

Figure 3:
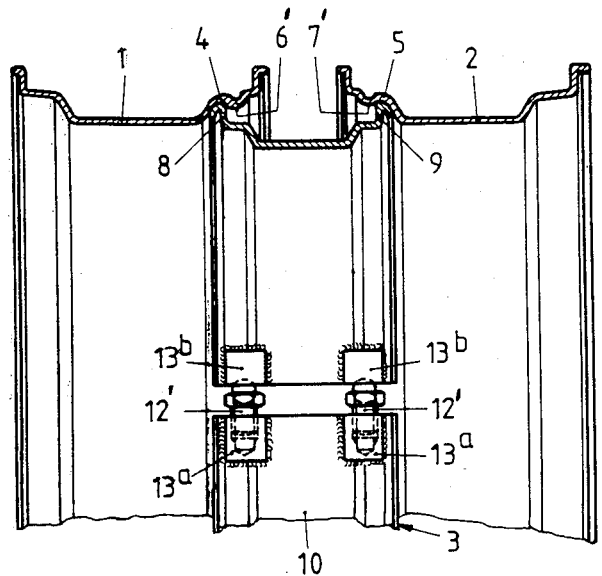
FIG. 3 shows a modification of the connecting device according to FIG. 1.
Figure 4:
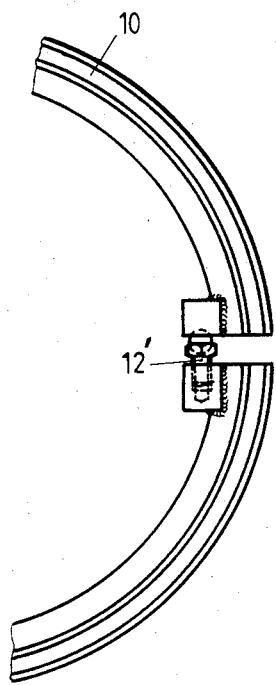
FIG. 4 shows an elevation of the split connecting ring at the position of the slit, in the connecting device according to FIG. 3
Figure 5:
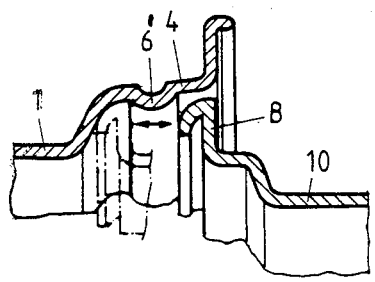
FIG. 5 shows a section on an enlarged scale at the position of the area of engagement between a wheel rim and the connecting ring of the device according to FIGS. 3 and 4.

In the embodiment according to FIGS. 3 to 5 the cams 6' and 7' are constituted by radially inward directed indentures. Said indentures may be provided in a simple manner by placing a die adapted to the desired shape of the cam against the interior circumferential surface of the rim portions 4 and 5 respectively and by pressing a corresponding stamp radially inwardly from the outer circumferential side.

The cams 6' and 7' cooperate with the outwardly directed flange shaped edges 8 and 9 respectively of the connecting device 3, said edges having been obtained by forcing the edges of a third rim 10, used as the connecting device, into sharp beaded edges. As in the first described embodiment the connecting rim 10 has been provided at one position with an axially directed dividing slit 11.

The dimensions of the connecting rim 10 have been selected such that the diameter of the beaded edges 8 and 9 in non-expanded condition of the connecting rim 10 is just smaller than the smallest inscribed circle diameter of the cams 6' and 7'. If now the connecting rim 10 in this untensioned or non-expanded condition respectively is assembled in axial direction with both wheel rims 1 and 2 the beaded edges 8 and 9 are permitted to pass the cams 6' and 7' respectively until they are stopped by a portion, lying further to the rear, of the respective wheel rims.

After the three rims have thus been assembled in axial direction a fixed coupling between both wheel rims 1 and 2 is established by expanding the connecting rim 10 in radial direction such that the beaded edges 8 and 9 are clamped behind the edges of the cams 6' and 7', which face in opposite directions, against the inner circumference of the wheel rims. The radial expansion of the rim therewith is obtained by means of a stud 12' provided at the position of the slit 11, the shaft portion of said stud being received in a thickened portion 13a of the rim portion adjacent to one side of the axial slit 11 and provided with a corresponding screw threaded hole, the head of the stud 12' resting against the opposite head surface of a thickened portion 13b of the rim portion adjacent to the other side of the axial slit 11, and this through the intermediary of a ball which is received in corresponding spherical recesses of the stud head surface and the opposite surface of the thickened portion respectively.

I claim:

1. A connecting device between two wheel rims, said rims comprising inner circumferential sides having facing edge portions each provided with a plurality of cams, and an intermediate ring which is provided coaxially between the rims and which has outwardly offset end edges in the shape of flanges extending beyond said cams, said intermediate ring having a split and being provided with tensioning means adjacent to the split which operates to expand the split and thereby radially to expand the ring so as to cause the end edges of the ring to engage behind said cams, thus clamping the ring to the facing edge portions of the rims.

2. A connecting device according to claim 1, characterized in that the cams are constituted by indentures having been pressed radially inwardly from the outer circumference of the rim.

3. A connecting device according to claim 1, characterized in that the split ring is constituted by a third rim provided at its circumference with an axial dividing slit, the diameter of the rim edge being in non-expanded condition of the rim just somewhat smaller than the (smallest) inscribed circle of the cams.

4. A connecting device according to claim 3, characterized in that the rim edges of the third rim have been deformed into beaded edges.

5. A connecting device according to claim 1, characterized in that the tensioning means are constituted by at least one stud provided at the position of the slit, the shaft of said stud being screwed into a thickened portion provided with corresponding screw thread, at one side of the slit, the head of the stud resting against the head surface of a thickened portion, extending in tangential direction and situated at the other side of the slit.

6. A connecting device according to claim 5, characterized in that a ball shaped thrust piece has been provided between the stud head and the opposite thickened portion, said thrust piece mating with corresponding spherical recesses in the facing surfaces of the stud head and the thickened portion.

7. A connecting device according to claim 1, characterized in that the tensioning means are constituted by at least one screw spindle provided at the position of the slit, said spindle being provided with sections having opposed hand and received in thickened portions provided with corresponding screw threads provided in the portions of the split ring adjacent both sides of the slit.

8. A device according to claim 7, characterized in that the screw spindle axis is tangent to the circumference of the split ring.

9. A device according to claim 7, characterized in that the screw spindle is provided between both screw threaded sections with an actuating collar which is accessible through the dividing slit.

* * * * *